US009996624B2

(12) United States Patent
Shukla et al.

(10) Patent No.: US 9,996,624 B2
(45) Date of Patent: Jun. 12, 2018

(54) SURFACING IN-DEPTH ARTICLES IN SEARCH RESULTS

(71) Applicant: Google LLC, Mountain View, CA (US)

(72) Inventors: Anand Shukla, Santa Clara, CA (US); Pavan K. Desikan, Palo Alto, CA (US); Isabelle L. Stanton, Mountain View, CA (US); Salvatore J. Candido, Mountain View, CA (US)

(73) Assignee: Google LLC, Mountain View, CA (US)

( * ) Notice: Subject to any disclaimer, the term of this patent is extended or adjusted under 35 U.S.C. 154(b) by 282 days.

(21) Appl. No.: 14/751,774

(22) Filed: Jun. 26, 2015

(65) Prior Publication Data

US 2015/0379140 A1 Dec. 31, 2015

Related U.S. Application Data

(60) Provisional application No. 62/018,751, filed on Jun. 30, 2014, provisional application No. 62/018,736, filed on Jun. 30, 2014.

(51) Int. Cl.
*G06F 7/00* (2006.01)
*G06F 17/30* (2006.01)

(52) U.S. Cl.
CPC .. *G06F 17/30867* (2013.01); *G06F 17/30345* (2013.01); *G06F 17/30528* (2013.01); *G06F 17/30554* (2013.01); *G06F 17/30864* (2013.01)

(58) Field of Classification Search
CPC .............................................. G06F 17/30528
See application file for complete search history.

(56) References Cited

U.S. PATENT DOCUMENTS

| 8,275,771 | B1 | 9/2012 | Malpani et al. |
| 2004/0215606 | A1* | 10/2004 | Cossock ............ G06F 17/30702 |
| 2005/0262050 | A1* | 11/2005 | Fagin ................ G06F 17/30864 |
| 2008/0114755 | A1 | 5/2008 | Wolters et al. |
| 2012/0101982 | A1 | 4/2012 | Gray et al. |
| 2013/0132401 | A1 | 5/2013 | Moon et al. |
| 2013/0282707 | A1 | 10/2013 | Stiffelman et al. |

OTHER PUBLICATIONS

Extended European Search Report issued in European Application No. 15174345.7 dated Dec. 1, 2015, 10 pages.

* cited by examiner

*Primary Examiner* — Ajith Jacob
(74) *Attorney, Agent, or Firm* — Fish & Richardson P.C.

(57) ABSTRACT

Methods, systems, and apparatus, including computer programs encoded on a computer storage medium, for performing actions of determining that one or more in-depth article search results are to be provided in response to a query, obtaining a topicality score for each in-depth article of a plurality of in-depth articles, each topicality score indicating a degree of relevance of a respective in-depth article to the query, obtaining a document score for each in-depth article of the plurality of in-depth article, each document score being based on a respective topicality score and a respective in-depth article score, selecting one or more in-depth articles from the plurality of in-depth articles based on respective document scores, and providing the one or more in-depth article search results for display, each in-depth article search result representing an in-depth article of the one or more in-depth articles.

21 Claims, 6 Drawing Sheets

SURFACING IN-DEPTH ARTICLES IN SEARCH RESULTS

CROSS-REFERENCE TO RELATED APPLICATIONS

This application claims priority to U.S. Prov. App. Nos. 62/018,751 and 62/018,736, both filed on Jun. 30, 2014, the disclosures of which are expressly incorporated herein by reference in the entirety.

BACKGROUND

The Internet provides access to a wide variety of resources, such as image files, audio files, video files, and web pages. A search system can identify resources in response to queries submitted by users and provide information about the resources in a manner that is useful to the users. The users can navigate through, e.g., select, search results to acquire information of interest.

SUMMARY

This specification relates to surfacing in-depth articles in search results.

Implementations of the present disclosure are generally directed to selectively surfacing in-depth articles in search. More particularly, implementations of the present disclosure are directed to identifying in-depth articles, and selectively providing graphical representations of in-depth articles in search results. Implementations of the present disclosure are further directed to providing one or more tags for an in-depth article, each tag representing a suggested query to surface one or more additional in-depth articles that are responsive to the suggested query. In some examples, the graphical representations include one or more tags.

In general, innovative aspects of the subject matter described in this specification can be embodied in methods that include actions of determining that one or more in-depth article search results are to be provided in response to a query, obtaining a topicality score for each in-depth article of a plurality of in-depth articles, each topicality score indicating a degree of relevance of a respective in-depth article to the query, obtaining a document score for each in-depth article of the plurality of in-depth article, each document score being based on a respective topicality score and a respective in-depth article score, selecting one or more in-depth articles from the plurality of in-depth articles based on respective document scores, and providing the one or more in-depth article search results for display, each in-depth article search result representing an in-depth article of the one or more in-depth articles. Other implementations of this aspect include corresponding systems, apparatus, and computer programs, configured to perform the actions of the methods, encoded on computer storage devices.

These and other implementations can each optionally include one or more of the following features: determining that one or more in-depth article search results are to be provided in response to a query includes: receiving one or more general search results that are responsive to the query, and determining that at least one general search result is associated with a publishing entity identified as a stellar source, and in response determining that one or more in-depth article search results are to be provided in search results; actions further include providing an in-depth article index, the in-depth article index storing data associated with each in-depth article in the plurality of in-depth articles; providing an in-depth article index includes: providing a set of target websites based on a set of seed websites, for one or more web pages of a target website in the set of target websites, determining an in-depth article score, and identifying content of the one or more web pages as an in-depth article based on the in-depth article score; identifying content of the one or more web pages as an in-depth article based on the in-depth article score includes: determining that the in-depth article score exceeds a threshold in-depth article score; providing a set of target websites based on a set of seed websites includes expanding the set of seed websites to include one or more websites based on a similarity between a seed website and the one or more websites; the data includes, for at least one in-depth article, an in-depth article score determined for the in-depth article, a uniform resource locator (URL) associated with the in-depth article, at least a portion of text of the in-depth article, an author of the in-depth article, and a publishing data of the in-depth article; and each in-depth article score is based on one or more sub-scores including at least one of an article score, a commercial score, an evergreen score, a site pattern score, and an author score.

In general, innovative aspects of the subject matter described in this specification can also be embodied in methods that include actions of determining that one or more in-depth article search results are to be provided in response to a query, obtaining a set of in-depth articles from a plurality of in-depth articles, the set of in-depth article including one or more in-depth articles, for which an in-depth article search result is to be displayed in search results, determining that at least one in-depth article in the set of in-depth articles is associated with a set of suggested queries, and providing the one or more in-depth article search results for display, an in-depth article search result representing the at least one in-depth article including one or more user-selectable tags based on respective one or more suggested queries in the set of suggested queries. Other implementations of this aspect include corresponding systems, apparatus, and computer programs, configured to perform the actions of the methods, encoded on computer storage devices.

These and other implementations can each optionally include one or more of the following features: actions further include obtaining the one or more suggested queries for a query/document pair including the query and the at least one in-depth article based on a set of candidate queries, the set of candidate queries including one or more candidate queries that are determined to be relevant to the query; a candidate query in the set of candidate queries is included as a suggested query in the set of suggested queries based a relevance score, the relevance score indicating a relevance of the candidate query to the query; obtaining the one or more suggested queries for a query/document pair includes obtaining a set of relevant queries based on the at least one in-depth article, each relevant query in the set of relevant being selected from a superset of queries, each query in the superset of queries including a trigger query that triggers surfacing of in-depth articles in search results; a trigger query in the superset of queries is included as a relevant query in the set of relevant queries based a relevance score, the relevance score indicating a relevance of the trigger query to the at least one in-depth article; the set of candidate queries is provided based on filtering one or more relevant queries from a set of relevant queries, the one or more queries being filtered based on respective overlap scores, each overlap score indicating a degree of overlap between a respective relevant query and the query; the overlap score is determined based on respective entity models of the respective relevant query and the query; actions further include: receiving user input indicating user selection of a user-selectable tag, receiving one or more additional in-depth articles based on a suggested query represented by the user-selectable tag, and providing one or more additional in-depth article search results for display, each additional in-depth article search result representing an additional in-depth article of the one or more additional in-depth articles.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Implementations of the present disclosure are generally directed to selectively surfacing in-depth articles in search. More particularly, implementations of the present disclosure are directed to identifying in-depth articles from content, and selectively providing graphical representations of in-depth articles in search results. In some implementations, a set of web sites is defined, and an in-depth article score is determined for respective content published on one or more web pages of respective web sites, and in-depth articles can be identified based on respective scores. In some implementations, it is determined whether in-depth articles are to be represented in search results. In some examples, if in-depth articles are to be represented in search results, one or more in-depth articles are selected at least partially based on respective in-depth article scores.

Implementations of the present disclosure are also directed to selectively providing graphical representations of in-depth articles in search results in response to a query, a graphical representation including one or more tags. In some examples, a tag represents a suggested query, e.g., a query that is suggested to the user. For example, a tag can be displayed as an element, e.g., a button, hypertext, that can be selected by a user, where, in response to user selection, e.g., clicking on the element, one or more additional in-depth articles are displayed in search results based on the suggested query represented by the tag. In some implementations, a set of suggested queries is determined for a respective query/document pairs, and a tag is provided for each suggested query in the set of suggested queries. In some examples, a query/document pair includes a trigger query, described herein, and an in-depth article, which is surfaced in search results, if the trigger query is submitted, e.g., to a search service. In some examples, in response to a trigger query being received, one or more tags corresponding to suggested queries in the set of suggested queries are displayed with the in-depth article.

Figure 1:
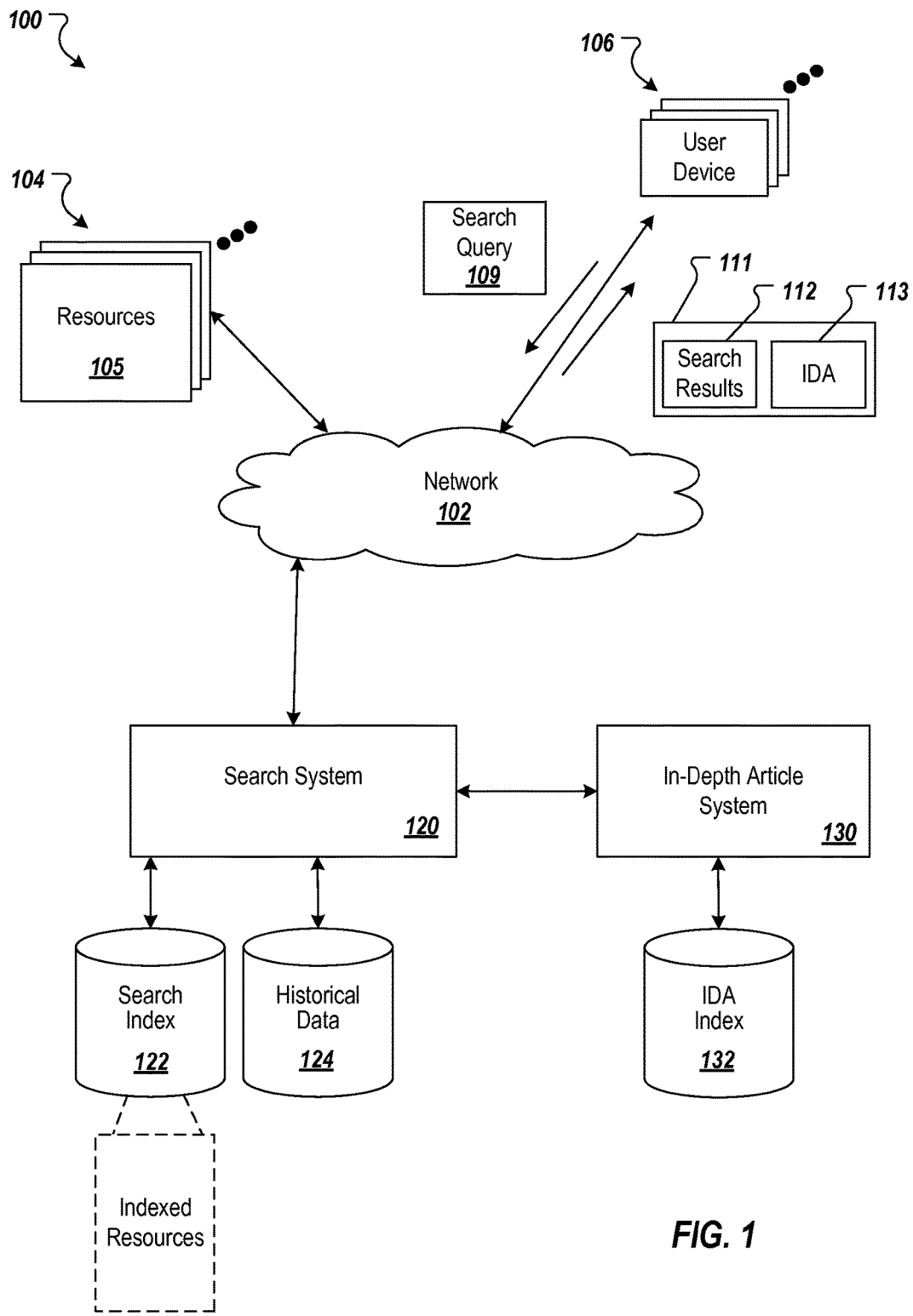
FIG. 1 depicts an example environment in which a search system provides search results.

FIG. 1 depicts an example environment 100 in which a search system provides search results. In some examples, the example environment 100 enables users to interact with one or more computer-implemented services. Example computer-implemented services can include a search service, an electronic mail service, a chat service, a document sharing service, a calendar sharing service, a photo sharing service, a video sharing service, blogging service, a micro-blogging service, a social networking service, a location (location-aware) service, a check-in service and a ratings and review service. In the example of FIG. 1, a search system 120 is depicted, which provides a search service, as described in further detail herein.

With continued reference to FIG. 1, the example environment 100 includes a network 102, e.g., a local area network (LAN), wide area network (WAN), the Internet, or a combination thereof, that connects web sites 104, user devices 106, and the search system 120. In some examples, the network 102 can be accessed over a wired and/or a wireless communications link. For example, mobile computing devices, such as smartphones, can utilize a cellular network to access the network 102. The environment 100 may include millions of web sites 104 and user devices 106.

In some examples, a web site 104 is provided as one or more resources 105 associated with a domain name and hosted by one or more servers. An example web site is a collection of web pages formatted in an appropriate machine-readable language, e.g., hypertext markup language (HTML), that can contain content. Example content includes text, images, multimedia content, and programming elements, e.g., scripts. Each web site 104 is maintained by a publisher, e.g., an entity that manages and/or owns the web site.

In some examples, a resource 105 is data provided over the network 102 and is associated with a resource address, e.g., a uniform resource locator (URL). In some examples, resources 105 that can be provided by a web site 104 include web pages, word processing documents, and portable document format (PDF) documents, images, video, and feed sources, among other appropriate digital content. The resources 105 can include content, e.g., words, phrases, images and sounds and may include embedded information, e.g., meta information and hyperlinks, and/or embedded instructions, e.g., scripts.

In some examples, a user device 106 is an electronic device that is capable of requesting and receiving resources 105 over the network 102. Example user devices 106 include personal computers, laptop computers, and mobile computing devices, e.g., smartphones and/or tablet computing devices, that can send and receive data over the network 102. As used throughout this document, the term mobile computing device ("mobile device") refers to a user device that is configured to communicate over a mobile communications network. A smartphone, e.g., a phone that is enabled to communicate over the Internet, is an example of a mobile device. A user device 106 can execute a user application, e.g., a web browser, to facilitate the sending and receiving of data over the network 102.

In some examples, to facilitate searching of resources 105, the search system 120 identifies the resources 105 by crawling and indexing the resources 105 provided on web sites 104. Data about the resources 105 can be indexed based on the resource to which the data corresponds. The indexed and, optionally, cached copies of the resources 105 are stored in a search index 122.

The user devices 106 submit search queries 109 to the search system 120. In some examples, a user device 106 can include one or more input modalities. Example modalities can include a keyboard, a touchscreen and/or a microphone. For example, a user can use a keyboard and/or touchscreen to type in a search query. As another example, a user can speak a search query, the user speech being captured through a microphone, and being processed through speech recognition to provide the search query.

In response to receiving a search query 109, the search system 120 accesses the search index 122 to identify resources 105 that are relevant to, e.g., have at least a minimum specified relevance score for, the search query 109. The search system 120 identifies the resources 105, generates a search results display 111 that includes search results 112 identifying resources 105, and returns the search results display 111 to the user devices 106. The search results 112 include general search results that are responsive to the query. In an example context, a search results display can include one or more web pages, e.g., one or more search results pages. In some examples, a web page can be provided based on a web document that can be written in any appropriate machine-readable language. It is contemplated, however, that implementations of the present disclosure can include other appropriate display types. For example, the search results can be provided in a display generated by an application that is executed on a computing device, and/or a display generated by an operating system, e.g., mobile operating system. In some examples, search results can be provided based on any appropriate form, e.g., Javascript-html, plaintext.

A search result 112 is data generated by the search system 120 that identifies a resource 105 that is responsive to a particular search query, and includes a link to the resource 105. An example search result 112 can include a web page title, a snippet of text or a portion of an image extracted from the web page, and a uniform resource locator (URL) of the web page. In some examples, data provided in the search results 112 can be retrieved from a resource data store. For example, the search system 120 can provide the search results display 111, which displays the search results 112. In some examples, the search results display 111 can be populated with information, e.g., a web page title, a snippet of text or a portion of an image extracted from the web page, that is provided from the resource data store.

In some examples, data for the search queries 109 submitted during user sessions are stored in a data store, such as the historical data store 124. For example, the search system 120 can store received search queries in the historical data store 124.

In some examples, selection data specifying actions taken in response to search results 112 provided in response to each search query 109 are also stored in the historical data store 124, for example, by the search system 120. These actions can include whether a search result 112 was selected, e.g., clicked or hovered over with a pointer. The selection data can also include, for each selection of a search result 112, data identifying the search query 109 for which the search result 112 was provided.

In accordance with implementations of the present disclosure, the example environment 100 also includes an in-depth article system 130 communicably coupled to the search system 120, e.g., directly coupled or coupled over a network such as network 102. Although the search system 120 and the in-depth article system 120 are depicted as separate systems in FIG. 1, it is contemplated that the search system 120 can include the in-depth article system 130. In some implementations, the in-depth article system 130 identifies content published by one or more web sites, which qualify as in-depth articles, as described in further detail herein. In some examples, the in-depth article system 130 indexes identified in-depth articles in an in-depth article (IDA) index 132. The in-depth article system 130 identifies one or more in-depth articles that may be relevant to the search query 109 based on data stored in the IDA index 132. In some examples, the in-depth article system 132 determines whether one or more in-depth articles are to be displayed in the search results display and, if so, identifies one or more in-depth articles that are to be represented in the search results display 111 based on data provided in the IDA index 132. In some examples, the search results display 111 includes search results 112 identifying resources 105, and IDA search results 113, which search results display 111 is provided to the user devices 106. The IDA search results 113 include graphical representations of one or more in-depth articles provided as content in one or more web sites. In some examples, one or more of the IDA search results 113 include one or more tags, as described in detail herein.

Implementations of the present disclosure are generally directed to selectively surfacing in-depth articles in search. More particularly, implementations of the present disclosure are directed to identifying content that qualify as in-depth articles within a plurality of resources. Example resources include network-available web pages published on web sites of publishing entities. For example, an in-depth article can be published by a publishing entity as content on one or more web pages of a web site, e.g., a domain, of the publishing entity. In some implementations, content published to one or more web pages of web sites of respective publishing entities is processed, and an in-depth article (IDA) score is determined for the content. In some examples, and as described in further detail herein, the IDA score indicates a degree, to which the content is determined to qualify as an in-depth article. In some implementations, a document score is determined for the content at least partially based on the IDA score and a topicality score. In some examples, the topicality score is determined based on a received query, e.g., search query, and reflects a degree, to which the content is considered relevant (or topical) to the query. In some implementations, the document score is used to determine whether an in-depth article search result that is representative of the respective content is to be surfaced in search results.

In some examples, an in-depth article is an article that provides insightful perspective on one or more topics, and/or includes a well-researched article that provokes deeper thought in readers. For example, in-depth articles can be described as so-called "read-to-learn" articles. In some examples, an in-depth article can be described as an article that does not simply provide a detailed or comprehensive overview of a topic, or an article that reports a news event. For example, an article that is directed to providing encyclopedic information on a topic would not be considered an in-depth article. As another example, an article that is directed to reporting a news event would not be considered an in-depth article.

Using university admissions as an example topic, example in-depth articles can include "Race and College Admissions, Facing a New Test by Justices," authored by Adam Liptak, and published on www.nytimes.com on Oct. 8, 2012, "Getting In," authored by Malcolm Gladwell, and published on www.newyorker.com on Oct. 10, 2005, and "The Myth of American Meritocracy," authored by Ron Unz, and published on www.theamericanconservative.com on Nov. 28, 2012. These example articles, provide insightful perspective on university admissions, and provoke deeper thought in some readers. Example articles that would not be described as in-depth articles with respect to university admissions include web pages of one or more universities describing respective admissions processes, and a web page published on an encyclopedic web site that generally describes university admissions processes.

In accordance with implementations of the present disclosure, content of a set of target web sites, e.g., a set of target domains, is processed to provide respective IDA scores. In some implementations, the set of target web sites is provided based on a set of seed web sites. In some examples, each web site is associated with an entity that publishes content. Example content includes digital content, such as online articles. In some examples, a web site can include one or more URLs, where each URL corresponds to a respective resource, e.g., a web page of the web site. For example, a fictional entity, Quality Publisher, can publish content on one or more pages of the web site www.qualitypublisher.com. In some examples, a web site can include a hierarchy of one or more directories and one or more sub-directories. Continuing with the example above, an example URL for a directory can include www.qualitypublisher.com/magazines/, and an example sub-directory can include www.qualitypublisher.com/magazines/articles/. In some examples, one or more web pages are provided within the web site. For example, a home page of the fictional entity can be located at www.qualitypublisher.com, and a page that includes an article can be located at www.qualitypublisher.com/magazines/articles/article1.htm. In some examples, an article can be distributed across a plurality of web pages. For example, a first page of an article can be located at www.qualitypublisher.com/magazines/articles/article1_1.htm, and a second page of an article can be located at www.qualitypublisher.com/magazines/articles/article1_2.htm.

In some implementations, one or more site patterns can be associated with a web site. In some examples, a site pattern is provided as a URL pattern, under which similar content is published. For example, Quality Publisher publishes articles using the site pattern www.qualitypublisher.com/*/articles/, where * indicates a wildcard, e.g., magazines. As another example, Quality Publisher publishes movie reviews using the site pattern www.qualitypublisher.com/*/movies/, where * indicates a wildcard, e.g., entertainment.

In some implementations, each seed web site in the set of seed web sites is a web site that is associated with an entity that is known to publish quality content, e.g., in-depth articles. In some examples, seed web sites are selected for inclusion in the set of seed web sites based on one or more criteria. In some examples, if at least one of the one or more criteria is true for a publishing entity, the respective web site is included as a seed web site in the set of seed web sites. Example criteria can include whether the entity underlying the web site has achieved one or more accolades. Example accolades can include winning an award, e.g., Pulitzer Prize, National Magazine Award. In some examples, criteria can include whether the entity underlying the web site has achieved one or more accolades within a specified time period, e.g., the last 10 years. For example, the web site of a publishing entity that has won a Pulitzer Prize or a National Magazine Award in the last 10 years is included as a seed web site in the set of seed web sites. As another example, the web site of a publishing entity that has not won a Pulitzer Prize or a National Magazine Award in the last 10 years is not included as a seed web site in the set of seed web sites.

In some implementations, the set of seed web sites is processed to provide the set of target web sites. In some examples, the set of target web sites includes the seed web sites of the set of seed web sites, and one or more web sites that are determined to be similar to one or more seed web sites of the set of seed web sites. In some implementations, the set of seed web sites is expanded to provide a first intermediate set of web sites, the first intermediate set of web sites is expanded to provide a second intermediate set of web sites, and the second intermediate set of web sites is contracted to provide the set of target web sites. In some examples, and as described in further detail herein, expansion and contraction is achieved based on similarity between web sites.

In some implementations, similarity between web sites can be determined using collaborative filtering. In some examples, collaborative filtering includes providing collaborative filtering (CF) models for each web site, and comparing CF models for similarity. In some examples, a CF model is based on off-web site anchor n-gram(s), e.g., unigrams and bigrams, that link to the respective web site. In some examples, each CF model provides a representation of anchor n-gram(s) of a respective web site. An anchor includes a link, e.g., hyperlink, from another web site to the respective web site, e.g., to a web page. In other words, an anchor is a reference from one web site to another web site. In some examples, the anchor includes text. For example, the anchor "great article" can be provided on a web site that, when selected by a user, navigates the user to a web page of another web site. In this example, the anchor includes a bigram, e.g., two words. In some implementations, a CF model is a multi-dimensional matrix that is provided by projecting a matrix into a plurality of dimensions. In some examples, the matrix is projected into the plurality of dimensions by computing a low rank approximation of the matrix using singular value decomposition (SVD). In plainer terms, each CF model is a representation of n-grams that other web sites use to describe a respective web site.

In some implementations, comparing CF models includes determining a similarity score that indicates a degree of similarity between the CF models. In some examples, the similarity score between CF models is provided as a cosine similarity between the CF models. In some examples, the cosine similarity is determined based on a cosine distance between CF models. For example, the cosine similarity can range between 1 and −1, where a cosine distance of zero degrees)($0°$) results in a cosine similarity of 1, a cosine distance of ninety degrees ($90°$) results in a cosine similarity of 0, and a cosine distance of one hundred eighty degrees ($180°$) results in a cosine similarity of −1. In some examples, a high cosine similarity indicates that the CF models, and thus the underlying web sites, are similar, while a low cosine similarity indicates that the CF models, and thus the underlying web sites, are not similar. More generally, two web sites are similar, if they are linked to by a similar set of anchor n-grams. In other words, two web sites are similar, if other web sites describe the two web sites using similar vocabulary.

As introduced above, the set of seed web sites is expanded to provide the first intermediate set of web sites. In some examples, web sites in a superset of web sites can each be compared to one or more seed web sites and respective similarity scores are provided. In some examples the superset of web sites can include web sites that have potential to include in-depth articles. In some examples, web sites that likely do not include in-depth articles are not included in the superset of web sites. For example, social networking web sites, blogging web sites, and commercial web sites are not included in the superset of web sites. Expansion of the set of seed web sites includes providing similarity scores between web sites of the superset of web sites and seed web sites of the set of seed web sites, as described above. Each similarity score is compared to a first threshold similarity score. In some examples, if the similarity score exceeds the first threshold similarity score, the respective web site of the superset of web sites is included in the first intermediate set of web sites. The first intermediate set of web sites is an expansion of the set of seed web sites. That is, the first intermediate set of web sites includes the seed web sites of the set of seed web sites, and one or more web sites of the superset of web sites. For example, the set of seed web sites can include tens to hundreds of web sites, while the first intermediate set of web sites can include hundreds to thousands of web sites.

As introduced above, the first intermediate set of web sites is expanded to provide the second intermediate set of web sites. In some examples, web sites in a subset of web sites can each be compared to one or more web sites of the first intermediate set of web sites and respective similarity scores are provided. In some examples the subset of web sites can include web sites of the superset of web sites that are not already included in the first intermediate set of web sites. Expansion of the first intermediate set of web sites includes providing similarity scores between web sites of the subset of web sites and web sites of the first intermediate set of web sites, as described above. Each similarity score is compared to a second threshold similarity score. In some examples, if the similarity score exceeds the second threshold similarity score, the respective web site of the subset of web sites is included in the second intermediate set of web sites. The second intermediate set of web sites is an expansion of the first intermediate set of web sites. That is, the second intermediate set of web sites includes the web sites of the first intermediate set of web sites, and one or more web sites of the subset of web sites. In some examples, the second threshold similarity score is greater than the first threshold similarity score. In this manner, a tighter expansion of the first intermediate set of web sites is provided, as compared to the expansion of the set of seed web sites. In some examples, the second intermediate set of web sites includes thousands of web sites.

In some implementations, the second intermediate set of web sites is contracted to provide the set of target web sites. More particularly, one or more web sites are filtered from the second intermediate set of web sites to provide the set of target web sites. In some implementations, a set of bad seed web sites is provided and can include one or more web sites that are known to likely not include in-depth articles. Example web sites in the set of bad seed web sites can include social networking web sites, blogging web sites, and commercial web sites. In some examples, web sites in the set of bad seed web sites can each be compared to one or more web sites of the second intermediate set of web sites and respective similarity scores are provided. Contraction of the second intermediate set of web sites includes providing similarity scores between web sites of the set of bad seed web sites and web sites of the second intermediate set of web sites, as described above. In some examples, if the similarity score exceeds a third threshold similarity score, the respective web site is filtered from the second intermediate set of web sites. In other words, if a web site of the second intermediate set of web sites is sufficiently similar to a bad seed web site, the web site is filtered from the second intermediate set of web sites. The set of target web sites is a contraction of the second intermediate set of web sites. That is, the set of target web sites includes web sites of the second intermediate set of web sites that have not been filtered from the second intermediate set of web sites.

In accordance with implementations of the present disclosure, the set of target web sites includes web sites that are to be processed to identify content that qualifies as in-depth articles. More particularly, content of web pages of each of the target web sites is processed and respective IDA scores are provided. In some examples, the IDA score can vary between a minimum value, e.g., 0, and a maximum value, e.g., 1. In some examples, an IDA score is determined based on one or more sub-scores. Example sub-scores include an article score, a commercial score, an evergreen score, a site pattern score, and an author score. In some examples, each sub-score can vary between a minimum value, e.g., 0, and a maximum value, e.g., 1. In some implementations, the IDA score of respective content, e.g., published on one or more web pages, is provided as a combination of the sub-scores. In some examples, the IDA score is specific to a URL, e.g., the web page on which the content is published. In some examples, the IDA score is specific to a plurality of URLs, e.g., two or more web pages across which the content is published.

In some implementations, the article score indicates a degree, to which the content of a URL is long-form content. In some examples, long-form content is content that has a length, e.g., word count and/or number of pages, that is greater than a threshold length. For example, if the word count exceeds a threshold word count, a first value, e.g., 1, can be assigned to the article score, and, if the word count does not exceed the threshold word count, a second value, e.g., 0, can be assigned to the article score. In some examples, long-form content is content that has a structure, e.g., number of paragraphs, length of each paragraph, that is representative of in-depth article structures. In some examples, the length of individual paragraphs within the content is an indication as to whether the content is long-form content. For example, news stories and other short articles tend to be composed of short paragraphs reporting basic facts, while long-form content is often written in a narrative style with longer paragraphs. For example, a number of paragraphs that have a word count greater than a threshold number of paragraphs can be determined, where, if the number of paragraphs exceeds the threshold number of paragraphs, a first value, e.g., 1, can be assigned to the article score, and, if the number of paragraphs does not exceed the threshold number of paragraphs, a second value, e.g., 0, can be assigned to the article score.

In some examples, an article score is determined for each URL of a target web site. In some examples, the content of the URL is parsed and partitioned into paragraphs annotated by the location on the page, e.g., center column, comments, hidden content. In some examples, parsing and partitioning can be performed based on code provided in the hypertext mark-up language (HTML) of the URL. In some examples, parsing and partitioning of the content provides a summary sketch for the URL, and the article score can be determined as a function of the summary sketch. In some examples, the summary sketch provides the word count of the content, the number of paragraphs in the content, the word count of respective paragraphs of the content, and/or the location of the respective paragraphs. In some examples, and as noted above, content can be published across multiple URLs, e.g., web pages. Accordingly, the article score for the content is determined based on the article scores score across the multiple URLs.

In some implementations, the commercial score is determined based on a base commercial score that is adjusted based on commercial scores of one or more other URLs. In some examples, the commercial score is provided by a commercial scoring engine. For example, a URL is provided to the commercial scoring engine, which returns a commercial score for the URL. In some examples, the base commercial score is determined based on term, phrases and/or interaction elements provided in the content of a URL. For example, terms and/or phrases that indicate a commercial context, e.g., offer, sale, discount prices, and/or interaction elements, e.g., text boxes for entering credit card information, indicate commercial character. In some examples, the commercial score is proved based on the base commercial score and respective commercial scores of one or more other URLs that have the same site pattern. For example, the base commercial score of a web page having the site pattern www.qualitypublisher.com/*/articles/ can be adjusted based on commercial scores of other web pages having the same site pattern. In some examples, the commercial score for the web page can be provided as an average of the base commercial score and the commercial scores of the one or more other URLs.

In some implementations, the commercial score for content can be compared to a threshold commercial score. In some examples, if the commercial score exceeds the threshold commercial score, the content is deemed to be overtly commercial and the content is excluded from being surfaced as an in-depth article. For example, the IDA score of the respective content is set equal to a minimum value, e.g., 0, and the content is not provided in the IDA index 132 of FIG. 1. In some examples, if the commercial score does not exceed the threshold commercial score, the commercial score is used to determine the IDA score, as described herein.

In some implementations, the evergreen score indicates a degree, to which the content is determined to be so-called evergreen content. In some examples, evergreen content includes content that may be relevant regardless of age. That is, for example, the content is still relevant and interesting despite publication date. In some examples, evergreen can be described as sustained interest over time.

In some implementations, a manner, in which the evergreen score is determined, can be provided based on a publication date of the content. In some examples, if the content was published greater than a threshold period ago, e.g., months ago, days ago, the evergreen score is determined based on an anchor distribution over time. That is, the content is determined to be sufficiently mature to have an anchor distribution that is a reliable indicator of whether the content is evergreen content. In some examples, if the content was published less than or equal to the threshold period ago, the evergreen score is determined using a predictive model. That is, the content is determined to be too fresh, such that an anchor distribution for the content may not be a reliable indicator of whether the content is evergreen content.

In some implementations, the anchor distribution indicates a distribution of anchor links from one or more other web sites to the content, e.g., web page(s), over time. That is, the anchor distribution reflects a level of sustained interest in the content over time. In some examples, a number of anchors spread out over a period of time indicate a high-level of sustained interest in the content, while a number of anchors centered over a particular segment of the period of time indicates a low-level of sustained interest in the comment. For example, a first example article, e.g., first content published by a web site, includes 400 anchors distributed over a period of time, e.g., X years. This indicates, for example, that web sites consistently reference the first example article over the period of time. A second example article, e.g., second content published by a web site, includes 10 anchors distributed over a particular segment of a period of time, the 10 anchors occurring during an initial segment of the period of time. This indicates, for example, that web sites briefly referenced the second example article only over a particular segment of the period of time. Consequently, the first example article is assigned an evergreen score having a first value, e.g., 1, and the second example article is assigned an evergreen score having a second value, e.g., 0.

In some implementations, a predictive model is used to determine the evergreen score, if the content was published less than or equal to the threshold period ago. In some examples, the predictive model is used to predict whether the content is likely evergreen content based on previously published evergreen content. In some examples, the predictive model is specific to the web site that the URL, and thus the content, is published through. In some examples, the predictive model is provided as a predictive Bayesian model. In some examples, content is assigned an evergreen score of either a first value, e.g., 1, or a second value, e.g., 0, based on the predictive model.

In some implementations, the predictive model is specific to the domain of the publishing entity. That is, a predictive model is provided for each publishing entity represented in the set of target web sites. In some examples, the predictive model is based on parameters associated with known evergreen articles published by the publishing entity on the domain. For example, a known evergreen article includes content having an evergreen score set equal to the first value, e.g., 1. In some examples, the predictive model is trained based on characteristics of the known evergreen articles. Example characteristics include the length and the number of anchors at particular points in time. For example, when an article is first published, there may be few to no anchors, but the number of anchors can grow over time. So, for example, for each known evergreen article, the number of anchors can be determined for each segment of time, e.g., day, month, after publication.

In some implementations, the predictive model can be applied to fresh content based on characteristics of the content. For example, given content from the particular web site, characteristics can include the length, e.g., classified into short, medium and long, the age, e.g., time since publication, and the number of anchors. Using the predictive model, these characteristics can be compared to the modeled characteristics of the known evergreen content, and a probability that the fresh content will become evergreen content can be provided. For example, if known evergreen articles of length L and anchors A on day D are modeled, fresh content that is of a length approximately equal to length L and has anchors approximately equal to anchors A on day D, can be determined to have a high likelihood of becoming evergreen content. In some examples, the probability can be compared to a threshold probability to determine the evergreen score. For example, if the probability exceeds the threshold probability, the evergreen score can be set to the first value, and, if the probability score does not exceed the threshold probability, the evergreen score can be set to the second value.

In some implementations, the site pattern score indicates a probability that a particular site pattern includes evergreen content. In some examples, a site pattern can be associated with one or more known evergreen content. In some examples, based on the overall content associated with the site pattern, a probability that the site pattern includes evergreen content can be provided. For example, for www.qualitypublisher.com it can be determined that M % of content classified as long are evergreen content, while N % of content over all lengths are evergreen content, e.g., M is greater than N. Such statistics can be determined for one or more site patterns. For example, it can be determined that content published under www.qualitypublisher.com/*/articles/ has a higher probability of being evergreen content than content published under www.qualitypublisher.com/*/movies/. In some implementations, a site pattern score can be determined for each site pattern based on the probability. For example, the probability of content published under the site pattern being evergreen content can be compared to a threshold probability. In some examples, if the probability exceeds the threshold probability, the site pattern score can be set to a first value, e.g., 1, and, if the probability score does not exceed the threshold probability, the site pattern score can be set to a second value, e.g., 0.

In some implementations, the author score indicates a degree to which the author that authored the content is known to author evergreen content. In some examples, the author score is determined based on a number of content, e.g., articles, authored by the author, whether the content is evergreen content, and the length of the respective content. For example, an initial author score can be provided based on the number of content authored by the author, and the base author score can be modified, e.g., increased, based on the number of evergreen content and the length of content, e.g., longer content increasing the author score more than shorter content.

In some implementations, and as introduced above, the IDA score of respective content is provided as a combination of the sub-scores. In some examples, the sub-scores are multiplied together to provide the IDA score. In some examples, the IDA score can be provided as a sum of the sub-scores. In some examples, the IDA score can be provided as a weighted sum of the sub-scores. For example, respective weights can be applied to each of the sub-scores to provide weighted sub-scores that can be summed. In some examples, the IDA score can be provided as a weighted average of the sub-scores. For example, respective weights can be applied to each of the sub-scores to provide weighted sub-scores that can be averaged. In some examples, weighting sub-scores enables sub-scores to have different levels of influence on the IDA score.

In some implementations, each IDA score can be compared to a threshold IDA score. In some examples, if an IDA score exceeds the threshold IDA score, the underlying content is determined to qualify as an in-depth article. In some examples, if an IDA score does not exceed the threshold IDA score, the underlying content is determined to not qualify as an in-depth article.

Some in-depth articles can tie together several topics. For example, the in-depth article "The Jefferson Bottles," authored by Patrick Radden Keefe, and published on www.newyorker.com on Sep. 3, 2007, might be relevant to several queries, e.g., [wine], [wine counterfeiting], [fraud], [Thomas Jefferson], [hardy rodenstock], [wine collecting]. The example in-depth article "Getting In," introduced above, might be relevant to several queries, e.g., [testing], [test scores], [university of toronto], [harvard college], besides the query [university admissions], which could have triggered the in-depth article being surfaced in search results, as described in further detail below.

In some implementations, each content is stored in an IDA index, e.g., the IDA index 132 of FIG. 1, along with the respective IDA score. In some implementations, only content that is determined to qualify as an in-depth article is stored in the IDA index. In some examples, data associated with the content is also stored in the IDA index. Example data can include the URL(s) associated with the content, one or more snippets of text from the content, the author of the content, the date of publication of the content, and one or more images associated with the content. In some examples, data can also include a set of topics associated with the respective in-depth article, e.g., content. In some examples, the content can be provided to a topic engine that processes the content, e.g., text, to associated one or more topics with the content based on terms and/or phrases provided in the content. For example, a topics table can be accessed by the topic engine, which includes a list of topics and, for each topic, one or more terms and/or phrases associated with the topic. Using the topic "cars" as an example, one or more example terms and/or phrases can include "hood," "dashboard," "horsepower," "engine," "suspension," "driveline," "top speed," and "zero to sixty." In some examples, one or more terms and/or phrases of the in-depth article can be used to index the topics table to provide the set of topics for the in-depth article.

In accordance with implementations of the present disclosure, in-depth articles are selectively surfaced in search results in response to a query. For example, a user can submit a query to a search system, e.g., the search system 120 of FIG. 1, it can be determined whether one or more in-depth articles are to be represented in search results, and, if so, which in-depth articles are to be represented. In some implementations, if it is determined to surface in-depth articles, general search results, e.g., search results 112 of FIG. 1, and IDA search results, e.g., IDA search results 113 of FIG. 1, are provided.

In some implementations, whether to surface in-depth articles in search results is determined based on the general search results that are provided in response to the query. In some examples, a set of general search results that are responsive to the query and are to be displayed in one or more search results pages is provided, e.g., from the search index 122 of FIG. 1. In some examples, the set of search results are reviewed to determine whether one or more of the search results is associated with a so-called stellar source. In some examples, a stellar source includes a publishing entity that is identified as a stellar source, as described in further detail below. A stellar source includes an publishing entity that is known to frequently publish in-depth articles. In some examples, if one or more of the general search results is associated with a stellar source, in-depth articles are to be represented in search results, and if none of the general search results is associated with a stellar source, in-depth articles are not to be represented in search results.

In some implementations, a publishing entity can be labeled as a stellar source based on information associated with one or more web pages published by the publishing entity. For example, one or more URL patterns, described above, of a web site of the publishing entity can be reviewed to determine how content of web pages corresponding to a respective URL pattern is shared and/or linked to by other, reputable entities, and how often the content was linked to with positive anchor text, e.g., "great article," "feature article," "detailed piece." In some examples, one or more reputable entities are provided in a table of reputable entities. In some implementations, a list of stellar sources is provided, each stellar source being represented as a site pattern, e.g., www.qualitypublisher.com/reporting, www.qualitypublisher.com/magazines/articles, www.great-publisher.com/stories.

In some examples, one or more URLs that are to be displayed in general search results are cross-referenced with the site patterns provided in the list of stellar sources. If, a URL corresponds to a site pattern in the list of stellar sources, it is determined that in-depth articles are to be represented in search results.

In some implementations, if it is determined that in-depth articles are to be represented in the search results, one or more in-depth articles are selected, e.g., from the IDA index 132 of FIG. 1. In some implementations, a document score is determined for each in-depth article, e.g., content, URL, provided in the IDA index based on the respective IDA score and a respective topicality score. In some examples, the topicality score is specific to an in-depth article and the query. For example, the topicality score reflects a degree of relevance of the in-depth article to the query. In other words, the topicality score reflects how topical the in-depth article is to the query.

In some examples, a set of topics can be provided for the query. For example, a table of queries and respective sets of topics can be provided. In some examples, in response to receipt of the query, the table of queries can be cross-referenced based on the query, and a respective set of topics can be retrieved. In some examples, a set of topics can be provided for the in-depth article, e.g., from the IDA index.

In some examples, topics in the set of topics of the in-depth article can be compared to topics in the set of topics for the in-depth article to provide the topicality score. In some examples, the topicality score indicates a degree of overlap between the sets of topics. For example, if the sets of topics have no topics in common, the topicality score can be set equal to a minimum value, e.g., 0. As another example, if all of the topics of one set of topics are included in the other set of topics, the topicality score can be set equal to a maximum value, e.g., 1. In some examples, the topicality score can land between the minimum value and the maximum value based on the degree of overlap in topics between the sets of topics.

In some implementations, the document score can be determined based on one or more other scores and/or multipliers provided for the particular content. For example, a multiplier can be associated with content based on a number of times the web page(s) that include the content ha(s/ve) been visited by users. As another example, a multiplier can be associated with the content based on whether the web page(s) are determined to be spam.

As introduced above, a document score is determined for each in-depth article, e.g., provided in the IDA index based on the respective IDA score and a respective topicality score. In this manner, a plurality of document scores is provided. In some examples, the document score is provided as a sum, or weighted sum, of the topicality score and the IDA score (and/or any other scores or multipliers). In some examples, the document score is provided as a product, or weighted product, of the topicality score and the IDA score (and/or any other scores or multipliers). In some examples, the document score is provided as an average, or weighted average, of the topicality score and the IDA score (and/or any other scores or multipliers).

In some implementations, a predetermined number of in-depth articles are to be represented in search results. For example, X in-depth articles, e.g., X=3, are to be represented in search results. Consequently, the in-depth articles with the top X document scores are selected for inclusion in the search results. In some examples, data associated with the selected in-depth articles is provided from the IDA index, and is included in the graphical representations of the respective in-depth articles in the search results, e.g., included in the IDA search results 113 of FIG. 1.

Implementations of the present disclosure are also directed to providing graphical representations of in-depth articles in search results in response to a query, where a graphical representation includes one or more tags. In some examples, a tag represents a suggested query, e.g., a query that is suggested to the user. For example, a tag can be displayed as an element, e.g., a button, hypertext, that can be selected by a user, where, in response to user selection, e.g., clicking on the element, one or more additional in-depth articles are displayed in search results based on the suggested query represented by the tag. In some implementations, a set of suggested queries is determined for a respective query/document pairs, and a tag is provided for each suggested query in the set of suggested queries. In some examples, a query/document pair includes a trigger query, described herein, and an in-depth article, which is surfaced in search results, if the trigger query is submitted, e.g., to a search service. In some examples, in response to a trigger query being received, one or more tags corresponding to suggested queries in the set of suggested queries are displayed with the in-depth article.

In some examples, depending on the query that a user submitted, which resulted in an in-depth article being surfaced in search results, a query that the user is likely to submit next may be influenced by the user's desire to learn more about a particular topic. In some examples, and in accordance with the present disclosure, a tag is provided, which a user can select to surface additional in-depth article search results for a suggested query that is represented by the tag. Stated more plainly, a tag represents a query that is suggested based on an in-depth article displayed in search results, and the query that the in-depth article is surfaced in response to. The suggested query can be submitted to surface additional in-depth articles. In some examples, the additional in-depth articles correspond to one or more topics of the in-depth article, for which the tag is provided. In this manner, users can use tags to explore other in-depth articles that may have some commonality to an originally surfaced in-depth article, e.g., one or more topics in common.

In some implementations, each in-depth article can be associated with one or more tags. In some examples, each tag is specific to a query that, if submitted, triggers the respective in-depth article to be surfaced in search results. In some examples, such a query can be referred to as a trigger query, or an original query. That is, the query that results in in-depth articles being surfaced in search results, and the respective in-depth article being selected for representation in the search results. In some examples, a suggested query associated with the tag is different than the trigger query that the tag is specific to. For example, the trigger query can be relevant to a first topic that relates to the in-depth article, while the suggested query is relevant to a second topic that relates to the in-depth article. Using the example in-depth article "Getting In," the trigger query can include [university admissions] and can be relevant to the topic "admissions," while the suggested query [harvard college] can be relevant to the topic "Harvard college."

In some implementations, each in-depth article in a set of in-depth articles, e.g., $IDA_1, \ldots IDA_q$, can be associated with a set of trigger queries that includes one or more trigger queries. For example, the in-depth article $IDA_1$ can be associated with a set of trigger queries $TQ_1, \ldots, TQ_m$, where each trigger query $TQ_1, \ldots, TQ_m$ triggers surfacing of in-depth articles in search results, and the inclusion of the in-depth article $IDA_1$ in the search results. In some examples, one or more query/document pairs can be provided, where query refers to a particular trigger query and document refers to a particular in-depth article. For the example in-depth article $IDA_1$, example query/document pairs can include: $<TQ_1, IDA_1>; \ldots; <TQ_m, IDA_1>$.

As described in further detail herein, one or more of the query/document pairs can be associated with a set of suggested queries, e.g., $SQ_1, \ldots, SQ_p$. Although the example set of suggested queries includes multiple queries, it is contemplated that a set of suggested queries can include one or more queries. In some examples, a tag is provided for each suggested query in the set of suggested queries for a particular query/document pair to provide a set of tags, including one or more tags, for the query/document pair. For example, if the trigger query of the query/document pair is received, e.g., submitted by a user, the in-depth article of the query/document pair is surfaced in search results with one or more tags in the set of tags associated with the query/document pair. In some examples, not all query/documents pairs are associated with a set of suggested queries. Consequently, a tag might not be provided with an in-depth article search result depending on the query/document pair that triggered the in-depth article search results.

Obtaining a set of suggested queries $SQ_1, \ldots, SQ_p$ for a particular query/document pair, e.g., $<TQ_1, IDA_1>$ will be described in detail. In some implementations, a set of relevant queries is provided, where each query in the set of relevant queries is determined to be relevant to the in-depth article. For example, the in-depth article $IDA_1$ can be associated with a set of relevant queries $RQ_1, \ldots, RQ_n$. Although the example set of relevant queries includes multiple queries, it is contemplated that a set of relevant queries can include one or more queries. In some implementations, the set of relevant queries $RQ_1, \ldots, RQ_n$, is a sub-set of a superset of queries $Q_1, \ldots, Q_m$. In some examples, the superset of queries includes all queries that trigger the display of in-depth article search results.

In some implementations, a query of the superset of queries can be included in the set of relevant queries for a particular in-depth article, based on a relevance between the query and the in-depth article. In some examples, a relevance score is determined based on a query entity model and an in-depth article entity model. In some examples, the query entity model is provided for a query, for which a relevance to an in-depth article is to be determined, e.g., a query of the superset of queries, and an in-depth article entity model is provided for the in-depth article. In some examples, an initial entity model includes a set of one or more entities that are determined to be related to a subject, e.g., the trigger query, the in-depth article. In some examples, the initial entity model can be expanded to include related entities. In some examples, a related entity is an entity that has some association with an entity that is related to the subject in the initial entity model. In other words, a related entity, although not directly related to the subject, is related to an entity that is directly related to the subject. In one example, the query entity model can include a first set of entities, which have been determined to be directly related to the query and indirectly related to the query, and the in-depth article entity model can include a second set of entities, which have been determined to be directly related to the query and indirectly related to the query.

In some implementations, a set of entities for a subject, e.g., a query, an in-depth article, another entity, can be provided based on structured data. For example, a plurality of entities and information associated therewith can be stored as structured data in an entity graph. In some examples, an entity graph includes a plurality of nodes and edges between nodes. In some examples, a node represents an entity and an edge represents a relationship between entities. In some examples, the entity graph can be provided based on an example schema that structures data based on domains, types and properties. In some examples, a domain includes one or more types that share a namespace. In some examples, a namespace is provided as a directory of uniquely named objects, where each object in the namespace has a unique name, e.g., identifier. In some examples, a type denotes an "is a" relationship about a topic, and is used to hold a collection of properties. In some examples, a topic represents an entity, such as a person, place or thing. In some examples, each topic can have one or more types associated therewith. In some examples, a property is associated with a topic and defines a "has a" relationship between the topic and a value of the property. In some examples, the value of the property can include another topic.

In some examples, a query is provided to an entity annotator that selects one or more entities from an entity graph, which are directly related to the query, and the one or more entities are included in a set of entities associated with the query. In some examples, the set of entities associated with the query is expanded by providing one or more entities in the set of entities to the entity annotator, and receiving one or more additional entities, the one or more additional entities being indirectly related to the query, and being added to the set of entities associated with the query. In some examples, data associated with an in-depth article is provided to the entity annotator, which selects one or more entities from an entity graph, and the one or more entities are included in a set of entities associated with the in-depth article. In some examples, the set of entities associated with the in-depth article is expanded by providing one or more entities in the set of entities to the entity annotator, and receiving one or more additional entities, the one or more additional entities being indirectly related to the in-depth article, and being added to the set of entities associated with the in-depth article. In some examples, the data associated with the in-depth article can include one or more topics that have been associated with the in-depth article.

In some implementations, a query-IDA relevance score is determined based on the set of entities provided in the query entity model, and the set of entities provided in the in-depth article entity model. In some examples, the query-IDA relevance score is provided as a dot product between the set of entities provided in the query entity model, and the set of entities provided in the in-depth article entity model. In some examples, the query-IDA relevance score is compared to a threshold query-IDA relevance score. If the query-IDA relevance score exceeds the threshold query-IDA relevance score, the respective query is included the set of relevant queries for the in-depth article. If the query-IDA relevance score does not exceed the threshold relevance score, the respective query is not included the set of relevant queries for the in-depth article. Accordingly, a set of relevant queries is provided for each query/document pair, e.g., $<TQ_1, IDA_1>; \ldots; <TQ_m, IDA_1>$.

In some implementations, one or more queries are filtered from a set of relevant queries associated with a particular query/document pair to provide a set of candidate queries. For example, one or more queries can be filtered from the set of relevant queries $RQ_1, \ldots, RQ_n$ associated with the query/document pair $<TQ_1, IDA_1>$ to provide a set of candidate queries $CQ_1, \ldots, CQ_r$. In some examples, a relevant query can be filtered from the set of relevant queries based on a degree of relevance between the trigger query of the respective query/document pair and the relevant query. In some examples, if there is a relatively large degree of relevance, the relevant query is filtered from the set of relevant queries. In some examples, if there is a relatively small degree of relevance, the relevant query is not filtered from the set of relevant queries. In this manner, relevant queries that would result in almost the same in-depth articles being surfaced as the trigger query are filtered from the set of relevant queries, e.g., are not included as candidate queries in the set of candidate queries.

In some examples, an TQ-RQ overlap score, reflecting the degree of relevance, is determined based on comparing in-depth articles that the trigger query would surface in search results, e.g., if submitted by a user, to the in-depth articles that the relevant query, as a trigger query, would trigger in search results. In some examples, the TQ-RQ overlap score is provided as a dot product of in-depth articles that the trigger query and the relevant query would surface in search results. In some examples, the TQ-RQ overlap score is compared to a threshold TQ-RQ overlap score. If the TQ-RQ overlap score exceeds the threshold TQ-RQ overlap score, the respective relevant query is not included the set of candidate queries for the query/document pair. If the TQ-RQ overlap score does not exceed the threshold TQ-RQ overlap score, the respective relevant query is included the set of candidate queries for the query/document pair. In this manner, if a candidate query is included as a suggested query, as described in detail below, user selection of the candidate query would not surface exactly the same, or nearly the same, in-depth articles as the trigger query of the query/document pair.

In some implementations, the set of candidate queries of a query/document pair is processed to provide a set of suggested queries for the query document pair. For example, the set of suggested queries $SQ_1, \ldots, SQ_p$ is provided for the query/document pair $<TQ_1, IDA_1>$ based on the set of candidate queries $CQ_1, \ldots, CQ_r$. In some examples, one or more candidate queries are filtered from the set of candidate queries to provide the set of suggested queries. In some examples, a candidate query can be filtered based on a relevance of the candidate query to the trigger query of the query/document pair.

In some implementations, a CQ-TQ relevance score that reflects a relevance of a candidate query to a trigger query is determined. In some implementations, the CQ-TQ relevance score is determined based on one or more in-depth articles that would be surfaced for the candidate query and the trigger query, respectively. In some examples, an entity model is provided for the trigger query based on one or more in-depth articles that would be surfaced in response to the trigger query, and an entity model is provided for the candidate query based on one or more in-depth articles that would be surfaced in response to the candidate query. In some examples, each of the entity models is expanded to include related entities, as described above. That is, for example the entity model includes entities that are directly related to the subject, e.g., the candidate query, the trigger query, and entities that are indirectly related to the subject.

In some implementations, the entity models are compared to determine the CQ-TQ relevance score. In some examples, and as similarly described above, the CQ-TQ relevance score is determined based on an overlap between sets of entities provided in the respective entity models. In some examples, the CQ-TQ relevance score is based on entities that the entity models have in common. In some examples, the CQ-TQ relevance score is compared to a threshold CQ-TQ relevance score. If the CQ-TQ relevance score exceeds the threshold CQ-TQ relevance score, the respective candidate query is included as a suggested query the set of suggested queries for the in-depth article of the query/document pair. If the CQ-TQ relevance score does not exceed the threshold CQ-TQ relevance score, the respective candidate query is not included the set of suggested queries for the in-depth article of the query/candidate pair. Accordingly, a set of suggested queries is provided for the respective query/document pair, e.g., $<TQ_1, IDA_1>$.

In some implementations, the above-described actions are performed for one or more query/document pairs in a set of query/document pairs. In this manner, at least one query/document pair can be associated with a set of suggested queries that includes one or more suggested queries. In some examples, the set of suggested queries for a particular query/document pair can be stored in the IDA index. For example, for each document, e.g., in-depth article, one or more trigger queries can be provided, and for at least one of the one or more trigger queries, a set of suggested queries can be provided.

In some implementations, a query is received, and it is determined that an in-depth article is to be surfaced in search results in response to the query. That is, the query is a trigger query with respect to the in-depth article. It can be determined whether a set of suggested queries is provided for the trigger query for the in-depth article, e.g., for the particular query/document pair $<Q, D>$. If a set of suggested queries is not provided, the in-depth article is represented in search results without any tags. If, on the other hand, a set of suggested queries is provided, the in-depth article is represented in search results with one or more tags, e.g., a tag for each suggested query in the set of suggested queries.

Figure 2:
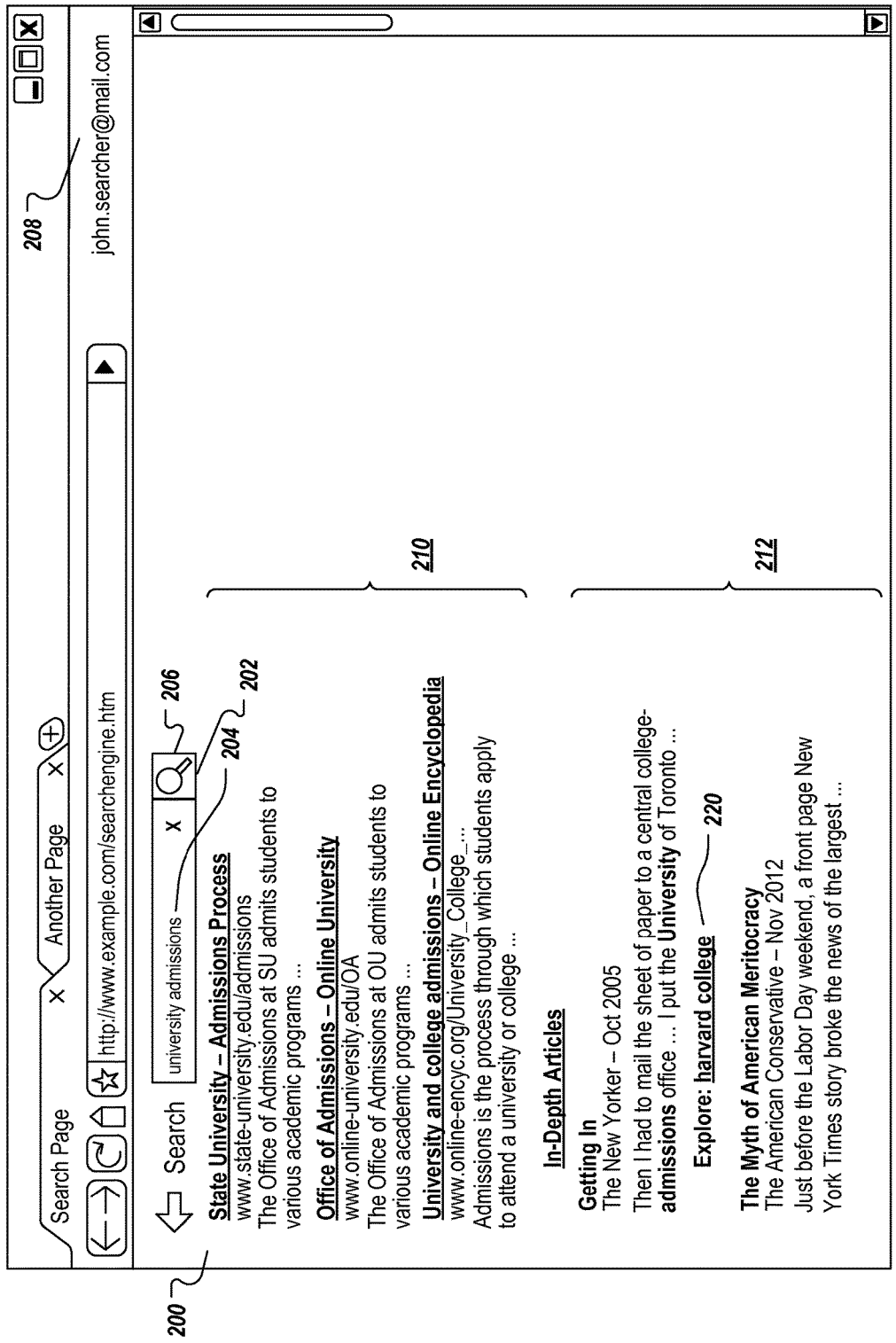
FIG. 2 depicts an example search results page including in-depth articles.

FIG. 2 depicts an example search results page 200 including in-depth articles. Although the example search results page 200 is depicted inside a web browser, this is for context only and is not intended to limit the scope of the present disclosure to any one web browser or even to implementations involving serving a web page. The illustrated search results page 200 includes a search box 202, a search query 204, a search button 206, user information 208, general search results 210, and in-depth article search results 212.

In the depicted example, the search query 204 is provided as [university admissions]. In response to the query 206, the general search results 210 are displayed, and the in-depth search results 212 are displayed. The general search results 210 represent content that would not be described as in-depth articles with respect to university admissions, and include web pages of one or more universities describing respective admissions processes, and a web page published on an encyclopedic web site that generally describes university admissions processes. The in-depth article search results 212 represent content that would be described as in-depth articles with respect to university admissions, provide insightful perspective on university admissions, and provoke deeper thought in some readers.

In the example of FIG. 2, an in-depth article search result 212 includes a tag 220. In some examples, the tag 220 is user-selectable, e.g., clickable, and the user can select a tag to surface in-depths articles associated with the suggested query represented by the respective tag. In the depicted example, the in-depth article "Getting In" includes a tag "harvard college," which represents a query [harvard college]. That is, for the query/document pair <[university admissions], D>, where D is a unique identifier assigned to "Getting In," a set of suggested queries is provided, which includes the query [harvard college]. In some examples, in response to the user selecting the tag "harvard college," one or more additional in-depth articles, for which the query [harvard college] is a trigger query are surfaced in search results. In some examples, the search results page is refreshed to display the in-depth article search results 212, including the one or more additional in-depth articles, above the general search results 210. In some examples, the general search results are refreshed based on the query [harvard college]. In this manner, in response to the tag "harvard college" being selected, the general search results 210 are refreshed to include search results that are responsive to the query [harvard college].

Figure 3:
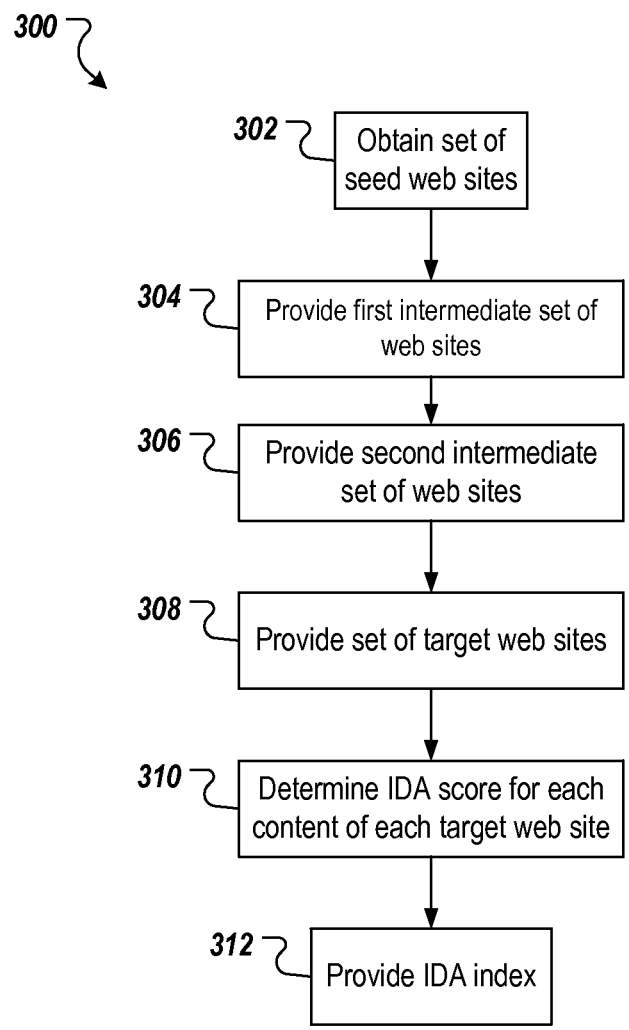
FIG. 3 depicts an example process that can be executed in accordance with implementations of the present disclosure.

FIG. 3 depicts an example process 300 that can be executed in accordance with implementations of the present disclosure. The example process 300 can be implemented, for example, by the example environment 100 of FIG. 1, e.g., the search system 120 and/or the in-depth article system 130. In some examples, the example process 300 can be provided by one or more computer-executable programs executed using one or more computing devices. The example process 300 can be performed to identify content that qualifies as in-depth articles.

A set of seed web sites is obtained (302). For example, a set of seed web sites is retrieved from computer-readable memory. In some examples, seed web sites in the set of seed web sites are associated with publishing entities that meet one or more criteria, e.g., whether the publishing entity underlying the web site has achieved one or more accolades within a specified time period. A first intermediate set of web sites is provided (304). For example, the set of seed web sites is expanded to include one or more web sites of a superset of web sites. In some examples, and as described in detail herein, expansion of the set of seed web sites is performed based on respective similarity scores between one or more seed web sites and one or more web sites in the superset of web sites. A second intermediate set of web sites is provided (306). For example, the first intermediate set of web sites is expanded to include one or more web sites of a subset of web sites. In some examples, and as described in detail herein, expansion of the first intermediate set of web sites is performed based on respective similarity scores between one or more web sites of the first intermediate set of web sites and one or more web sites in the subset of web sites.

A set of target web sites is provided (308). For example, the second intermediate set of web sites is contracted to remove one or more web sites. In some examples, and as described in detail herein, contraction of the second intermediate set of web sites is performed based on respective similarity scores between one or more web sites of the second intermediate set of web sites and one or more bad seed web sites in a set of bad seed web sites.

An IDA score is determined for each content of each target web site. In some examples, and as described herein, an IDA score is specific to one or more URLs, on which the content is provided. In some examples, the IDA score indicates a degree, to which the content is an in-depth article. In some examples, the IDA score is determined based on one or more of an article score, a commercial score, an evergreen score, a site pattern score, and an author score. An IDA index is provided (312). For example, IDA scores of respective content can each be compared to a threshold IDA score, and, if the IDA score exceeds the threshold IDA score, data associated with the content is also stored in the IDA index. Example data can include the IDA score, the URL(s) associated with the content, one or more snippets of text from the content, the author of the content, the date of publication of the content, one or more images associated with the content, and/or one or more topics associated with the content.

Figure 4:
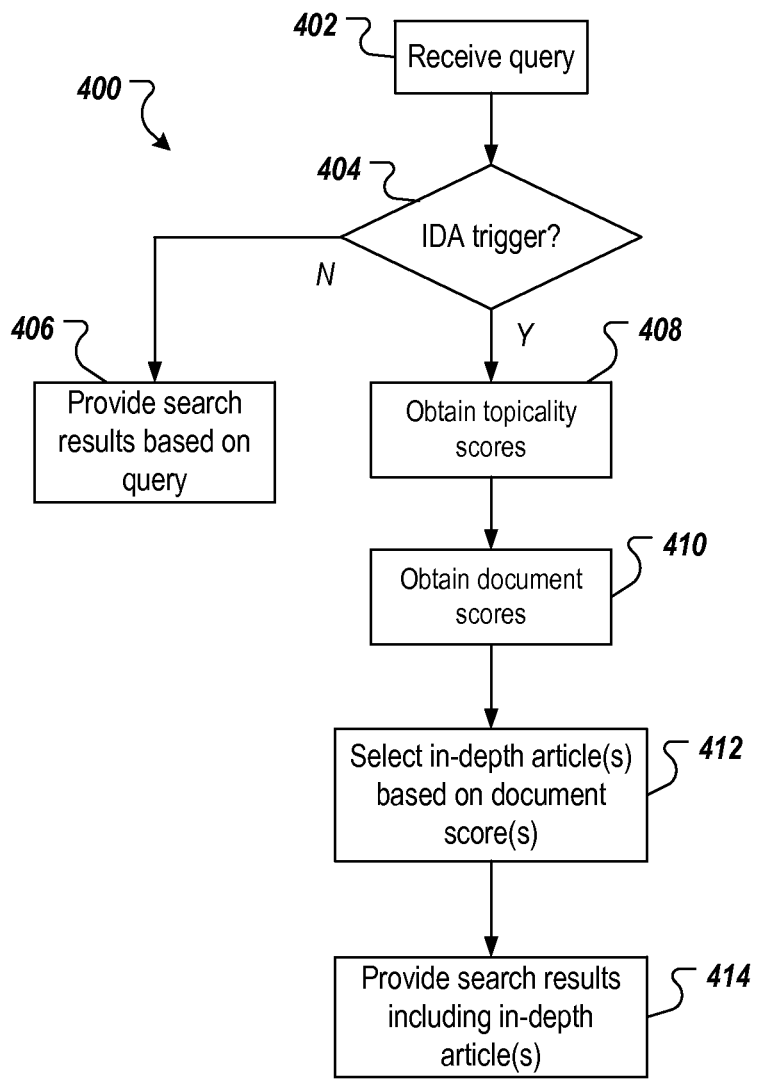
FIG. 4 depicts an example process that can be executed in accordance with implementations of the present disclosure.

FIG. 4 depicts an example process 400 that can be executed in accordance with implementations of the present disclosure. The example process 400 can be implemented, for example, by the example environment 100 of FIG. 1, e.g., the search system 120 and/or the in-depth article system 130. In some examples, the example process 400 can be provided by one or more computer-executable programs executed using one or more computing devices. The example process 400 can be performed to selectively surface in-depth articles in search results.

A query is received (402). For example, the search system 120 of FIG. 1 receives a query from a user device 106. It is determined whether in-depth search results are triggered (404). For example, one or more URLs that are to be displayed in general search results in response to the query are cross-referenced with the site patterns provided in a list of stellar sources. If, a URL corresponds to a site pattern in the list of stellar sources, it is determined that in-depth articles are to be represented in search results. If in-depth search results are not triggered, general search results are provided based on the query (406). For example, a search results display 111 including general search results 112 is displayed on the user device 106.

If in-depth search results are triggered, topicality scores are obtained (408). In some examples, topicality scores are provided for one or more in-depth articles in the IDA index. In some examples, and as described above, each topicality score can be determined based on a degree in overlap of one or more topics associated with the query and one or more topics associated with the respective content. Document scores are obtained (410). In some examples, document scores are provided for one or more in-depth articles in the IDA index. For example, respective IDA scores can be provided for each in-depth article, e.g., from the IDA index, and a document score can be determined for each in-depth article based on the respective topicality score and the respective IDA score.

One or more in-depth articles are selected based on respective document scores (412). In some examples, and as described herein, X in-depth articles, e.g., X=3, are to be represented in search results. Consequently, the in-depth articles with the top X document scores are selected for inclusion in the search results. In some examples, data associated with the selected in-depth articles is provided from the IDA index, and is included in the graphical representations of the respective in-depth articles in the search results, e.g., included in the IDA search results 113 of FIG. 1. Search results including in-depth articles are provided (414). For example, a search results display 111 including general search results 112 and IDA search results 113 is displayed on the user device 106.

Figure 5:
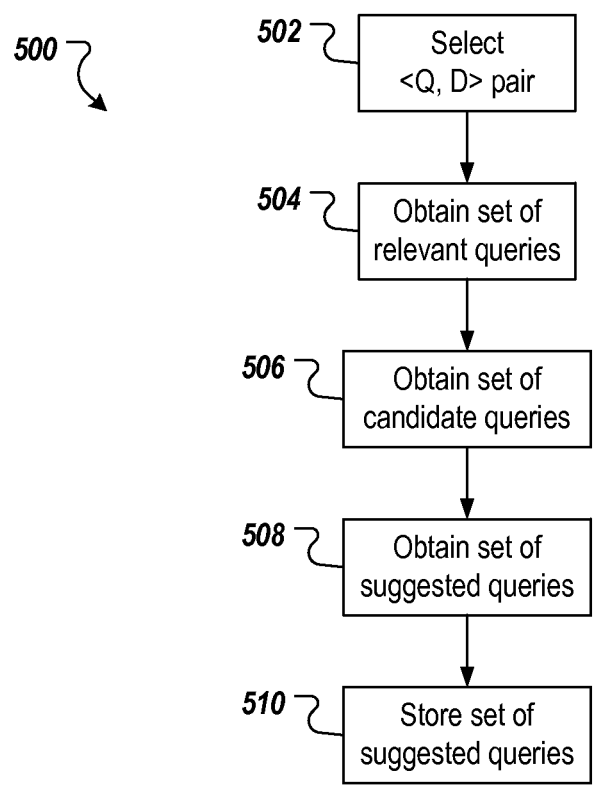
FIG. 5 depicts an example process that can be executed in accordance with implementations of the present disclosure.

FIG. 5 depicts an example process 500 that can be executed in accordance with implementations of the present disclosure. The example process 500 can be implemented, for example, by the example environment 100 of FIG. 1, e.g., the search system 120 and/or the in-depth article system 130. In some examples, the example process 500 can be provided by one or more computer-executable programs executed using one or more computing devices. The example process 500 can be performed for a particular query/document pair to provide a set of suggested queries for the query/document pair.

A query/document pair <Q, D> is selected (502). For example, a plurality of query/document pairs can be provided, and a particular query/document pair, e.g., <$TQ_1$, $IDA_1$>, is selected for determining a set of suggested queries, e.g., $SQ_1, \ldots, SQ_p$, to be associated therewith. A set of relevant queries is obtained (504). For example, a set of relevant queries, e.g., $RQ_1, \ldots, RQ_n$, for the selected <Q, D> is selected from a superset of queries. In some examples, the set of relevant queries $RQ_1, \ldots, RQ_n$, is a sub-set of a superset of queries $Q_1, \ldots, Q_m$. In some examples, and as described herein, the set of relevant queries is provide based on a query-IDA relevance score, which reflects a degree of overlap between a set of entities provided in a query entity model, and a set of entities provided in the in-depth article entity model. In some examples, queries in the superset of queries are selectively included in the set of relevant queries based on respective query-IDA scores.

A set of candidate queries is obtained (506). In some examples, a set of candidate queries $CQ_1, \ldots, CQ_r$ is provided based on the set of relevant queries $RQ_1, \ldots, RQ_n$. In some examples, a relevant query can be filtered from the set of relevant queries based on a degree of overlap between the trigger query of the respective query/document pair and the relevant query. In some examples, the set of candidate queries is provided based on respective TQ-RQ overlap scores, each TQ-RQ overlap score reflecting the degree of overlap between the trigger query of <Q, D> and a subject relevant query from the set of relevant queries. In some examples, relevant queries in the set of relevant queries are selectively filtered from the set of relevant queries based on respective TQ-RQ overlap scores.

Figure 6:
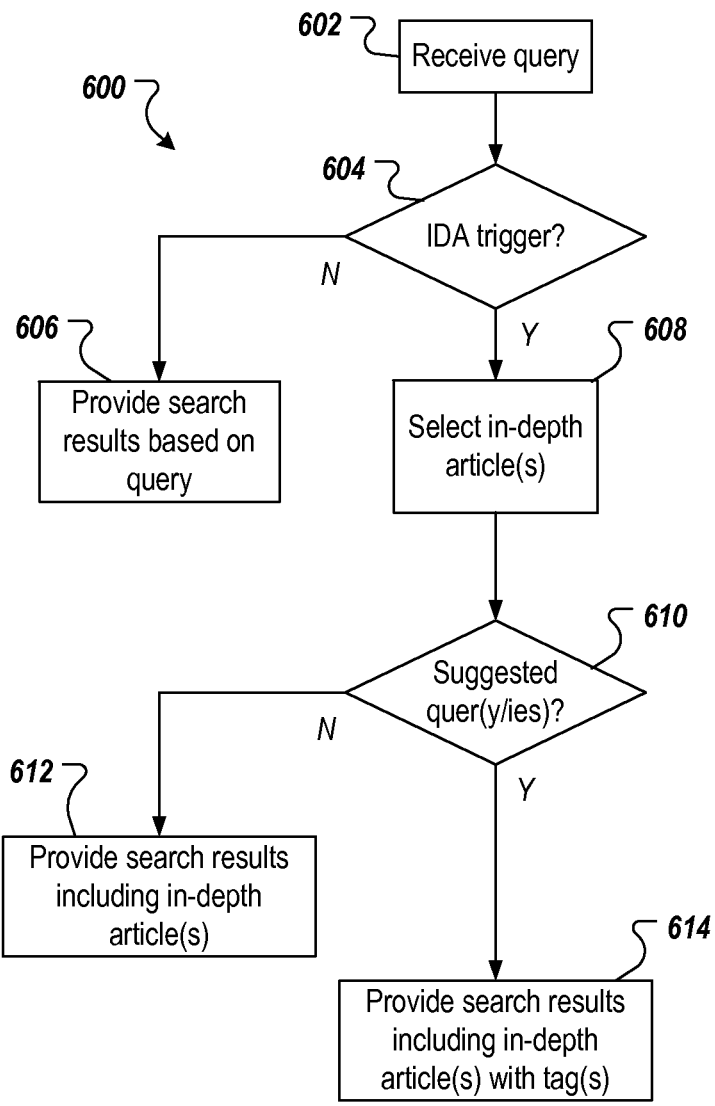
FIG. 6 depicts an example process that can be executed in accordance with implementations of the present disclosure.

A set of suggested queries is obtained (508). In some examples, a set of suggested queries $SQ_1, \ldots, SQ_p$ is provided based on the set of candidate queries $CQ_1, \ldots, CQ_r$. In some examples, one or more candidate queries are filtered from the set of candidate queries to provide the set of suggested queries. In some examples, and as described above, a candidate query can be filtered based on a CQ-TQ relevance score that reflects a relevance of a candidate query to a trigger query is determined. The set of suggested queries is stored (510). For example, and as described herein, the set of suggested queries can be stored and mapped to the particular query/document pair <Q, D> in the IDA index FIG. 6 depicts an example process 600 that can be executed in accordance with implementations of the present disclosure. The example process 600 can be implemented, for example, by the example environment 100 of FIG. 1, e.g., the search system 120 and/or the in-depth article system 130. In some examples, the example process 600 can be provided by one or more computer-executable programs executed using one or more computing devices. The example process 600 can be performed to selectively include one or more tags for an in-depth articles surfaced in search results.

A query is received (602). For example, the search system 120 of FIG. 1 receives a query from a user device 106. It is determined whether in-depth search results are triggered (604). If in-depth search results are not triggered, general search results are provided based on the query (606). For example, a search results display 111 including general search results 112 is displayed on the user device 106. If in-depth search results are triggered, one or more in-depth articles are selected to be represented in search results (608). In some examples, the one or more in-depth articles are selected based on respective document scores, as described above.

It is determined whether any of the one or more in-depth articles is associated with a set of suggested queries (610). In some examples, any sets of queries associated with the selected in-depth articles are provided from the IDA index. If no in-depth article is associated with a set of suggested queries, search results including in-depth articles are provided (612). For example, a search results display 111 including general search results 112 and IDA search results 113 is displayed on the user device 106. The in-depth article search results, in this case, do not include tags. If at least one in-depth article is associated with a set of suggested queries, search results including in-depth articles with one or more tags are provided (614). For example, a search results display 111 including general search results 112 and IDA search results 113 with at least one tag is displayed on the user device 106.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method executed by one or more processors, the method comprising:
   receiving, by the one or more processors, general search results that are responsive to a query;
   cross-referencing uniform resource locators (URLs) of the general search results with a site pattern of a publishing entity that is identified as publishing in-depth articles;
   determining, by the one or more processors, that one or more general search results to be provided in response to the query is an in-depth article search result based on the URL of the general search result corresponding to the site pattern of the publishing entity; and
   in response to determining that one or more in-depth article search results are to be provided in response to the query:
      obtaining, by the one or more processors, a topicality score for each in-depth article referenced by the one or more in-depth article search results responsive to the query, each topicality score indicating a degree of relevance of a respective in-depth article to the query;
      obtaining, by the one or more processors, a document score for each in-depth article referenced by the one or more in-depth article search results responsive to the query, each document score being based on a respective topicality score and a respective in-depth article score;
      selecting, by the one or more processors, one or more in-depth articles referenced by the one or more in-depth article search results responsive to the query based on respective document scores; and
      providing, by the one or more processors, the one or more in-depth article search results for display, each in-depth article search result representing an in-depth article of the one or more in-depth articles.

2. The method of claim 1, further comprising providing an in-depth article index, the in-depth article index storing data associated with each in-depth article in the plurality of in-depth articles.

3. The method of claim 2, wherein providing an in-depth article index comprises:
   providing a set of target websites based on a set of seed web sites;
   for one or more web pages of a target website in the set of target websites, determining an in-depth article score; and
   identifying content of the one or more web pages as an in-depth article based on the in-depth article score.

4. The method of claim 3, wherein identifying content of the one or more web pages as an in-depth article based on the in-depth article score comprises:
   determining that the in-depth article score exceeds a threshold in-depth article score.

5. The method of claim 3, wherein providing a set of target websites based on a set of seed websites comprises expanding the set of seed websites to include one or more websites based on a similarity between a seed website and the one or more websites.

6. The method of claim 2, wherein the data comprises, for at least one in-depth article, an in-depth article score determined for the in-depth article, a uniform resource locator (URL) associated with the in-depth article, at least a portion of text of the in-depth article, an author of the in-depth article, and a publishing data of the in-depth article.

7. The method of claim 1, wherein each in-depth article score is based on one or more sub-scores comprising at least one of an article score, a commercial score, an evergreen score, and an author score.

8. A system comprising:
   a data store for storing data; and
   one or more processors configured to interact with the data store, the one or more processors being further configured to perform operations comprising:
      receiving general search results that are responsive to a query;
      cross-referencing uniform resource locators (URLs) of the general search results with a site pattern of a publishing entity that is identified as publishing in-depth articles;
      determining, by the one or more processors, that one or more general search results to be provided in response to the query is an in-depth article search result based on the URL of the general search result corresponding to the site pattern of the publishing entity; and
      in response to determining that one or more in-depth article search results are to be provided in response to the query:
         obtaining a topicality score for each in-depth article referenced by the one or more in-depth article search results responsive to the query, each topicality score indicating a degree of relevance of a respective in-depth article to the query;
         obtaining a document score for each in-depth article referenced by the one or more in-depth article search results responsive to the query, each document score being based on a respective topicality score and a respective in-depth article score;
         selecting one or more in-depth articles referenced by the one or more in-depth article search results responsive to the query based on respective document scores; and
         providing the one or more in-depth article search results for display, each in-depth article search result representing an in-depth article of the one or more in-depth articles.

9. The system of claim 8, wherein operations further comprise providing an in-depth article index, the in-depth article index storing data associated with each in-depth article in the plurality of in-depth articles.

10. The system of claim 9, wherein providing an in-depth article index comprises:
    providing a set of target websites based on a set of seed web sites;
    for one or more web pages of a target website in the set of target websites, determining an in-depth article score; and
    identifying content of the one or more web pages as an in-depth article based on the in-depth article score.

11. The system of claim 10, wherein identifying content of the one or more web pages as an in-depth article based on the in-depth article score comprises:
    determining that the in-depth article score exceeds a threshold in-depth article score.

12. The system of claim 10, wherein providing a set of target websites based on a set of seed websites comprises expanding the set of seed websites to include one or more websites based on a similarity between a seed website and the one or more websites.

13. The system of claim 9, wherein the data comprises, for at least one in-depth article, an in-depth article score determined for the in-depth article, a uniform resource locator (URL) associated with the in-depth article, at least a portion of text of the in-depth article, an author of the in-depth article, and a publishing data of the in-depth article.

14. The system of claim 8, wherein each in-depth article score is based on one or more sub-scores comprising at least one of an article score, a commercial score, an evergreen score, and an author score.

15. A computer readable medium storing instructions that, when executed by one or more processors, cause the one or more processors to perform operations comprising:
    receiving, by the one or more processors, general search results that are responsive to a query;
    cross-referencing uniform resource locators (URLs) of the general search results with a site pattern of a publishing entity that is identified as publishing in-depth articles;
    determining, by the one or more processors, that one or more general search results to be provided in response to the query is an in-depth article search result based on the URL of the general search result corresponding to the site pattern of the publishing entity; and
    in response to determining that one or more in-depth article search results are to be provided in response to the query:
        obtaining a topicality score for each in-depth article referenced by the one or more in-depth article search results responsive to the query, each topicality score indicating a degree of relevance of a respective in-depth article to the query;
        obtaining a document score for each in-depth article referenced by the one or more in-depth article search results responsive to the query, each document score being based on a respective topicality score and a respective in-depth article score;
        selecting one or more in-depth articles referenced by the one or more in-depth article search results responsive to the query based on respective document scores; and
        providing the one or more in-depth article search results for display, each in-depth article search result representing an in-depth article of the one or more in-depth articles.

16. The computer readable medium of claim 15, wherein operations further comprise providing an in-depth article index, the in-depth article index storing data associated with each in-depth article in the plurality of in-depth articles.

17. The computer readable medium of claim 16, wherein providing an in-depth article index comprises:
    providing a set of target websites based on a set of seed web sites;
    for one or more web pages of a target website in the set of target websites, determining an in-depth article score; and
    identifying content of the one or more web pages as an in-depth article based on the in-depth article score.

18. The computer readable medium of claim 17, wherein identifying content of the one or more web pages as an in-depth article based on the in-depth article score comprises:
    determining that the in-depth article score exceeds a threshold in-depth article score.

19. The computer readable medium of claim 17, wherein providing a set of target websites based on a set of seed websites comprises expanding the set of seed websites to include one or more websites based on a similarity between a seed website and the one or more websites.

20. The computer readable medium of claim 16, wherein the data comprises, for at least one in-depth article, an in-depth article score determined for the in-depth article, a uniform resource locator (URL) associated with the in-depth article, at least a portion of text of the in-depth article, an author of the in-depth article, and a publishing data of the in-depth article.

21. The computer readable medium of claim 15, wherein each in-depth article score is based on one or more sub-scores comprising at least one of an article score, a commercial score, an evergreen score, and an author score.

* * * * *

UNITED STATES PATENT AND TRADEMARK OFFICE
CERTIFICATE OF CORRECTION

| | | |
|---|---|---|
| PATENT NO. | : 9,996,624 B2 | Page 1 of 1 |
| APPLICATION NO. | : 14/751774 | |
| DATED | : June 12, 2018 | |
| INVENTOR(S) | : Shukla et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 330 days.

Signed and Sealed this
Eighth Day of August, 2023

Katherine Kelly Vidal
*Director of the United States Patent and Trademark Office*